(12) United States Patent
Tsutsumi et al.

(10) Patent No.: US 7,337,565 B2
(45) Date of Patent: Mar. 4, 2008

(54) DISPLAY UNIT

(75) Inventors: Tamaki Tsutsumi, Kyoto (JP); Masaru Kamino, Kyoto (JP)

(73) Assignee: A'Syck Co., Ltd., Kyoto (JP)

( * ) Notice: Subject to any disclaimer, the term of this patent is extended or adjusted under 35 U.S.C. 154(b) by 242 days.

(21) Appl. No.: 10/551,632

(22) PCT Filed: Feb. 23, 2005

(86) PCT No.: PCT/JP2005/002905

§ 371 (c)(1),
(2), (4) Date: Sep. 30, 2005

(87) PCT Pub. No.: WO2005/088588

PCT Pub. Date: Sep. 22, 2005

(65) Prior Publication Data

US 2006/0207133 A1    Sep. 21, 2006

(30) Foreign Application Priority Data

Mar. 16, 2004  (JP) .............................. 2004-073784

(51) Int. Cl.
*G09F 3/04*    (2006.01)

(52) U.S. Cl. ...................... 40/451; 345/59; 340/815.53

(58) Field of Classification Search .......... 40/447–452; 345/25, 38–39, 50, 55, 59, 82–83, 87–88; 340/815.53; 313/510

See application file for complete search history.

(56) References Cited

U.S. PATENT DOCUMENTS

| | | | | |
|---|---|---|---|---|
| 3,858,341 A | * | 1/1975 | Wakabayashi | ............... 40/451 |
| 3,936,816 A | | 2/1976 | Murata | |
| 4,058,919 A | * | 11/1977 | Wakabayashi | ............... 40/451 |
| 4,949,081 A | * | 8/1990 | Keller et al. | .................. 345/33 |
| 5,266,934 A | * | 11/1993 | Van Almen | .................. 345/50 |
| 5,819,454 A | * | 10/1998 | Rosenitsch | .................. 40/452 |
| 6,081,248 A | * | 6/2000 | Hasegawa et al. | ......... 345/75.1 |

FOREIGN PATENT DOCUMENTS

| | | |
|---|---|---|
| EP | 0 146 285 A2 | 6/1985 |
| JP | S58-43488 | 3/1983 |
| JP | S59-193487 | 11/1984 |

\* cited by examiner

*Primary Examiner*—William L. Miller
(74) *Attorney, Agent, or Firm*—Kirschstein, et al.

(57) ABSTRACT

A display unit comprises a display region constituted of twenty-four display segments each of which has a triangular display surface. The display region consists of a quadrangular central region and a quadrangular and annular peripheral region surrounding the entire central region. The central region has two quadrangular portions arranged one above the other. Each of two quadrangular portions consists of four display segments. The peripheral region is constituted of sixteen display segments.

5 Claims, 6 Drawing Sheets

DISPLAY UNIT

TECHNICAL FIELD

This invention relates to a display unit, and particularly, to a display unit suited for displaying an alphanumeric character.

BACKGROUND ART

There has been known a 7 segment display unit as a conventional display unit for displaying an alphanumeric character. The 7 segment display unit can display numeric characters, 0 to 9 and only 8 alphabetic characters, A, C, F, E, U, P, H and L (in capital letters).

In order to eliminate this inconvenience, there has been provided a dot matrix display unit comprising a 5×7 dot display. However, 35 display elements are required to construct the dot matrix display unit and furthermore, the dot matrix display unit can display an alphanumeric character in only a circular pattern or a square pattern.

There has also been conventionally known an alphanumeric display type display unit as a display unit for displaying an alphanumeric character. This display unit, however, has difficulty in displaying an alphabetic character correctly and is inferior to the other conventional display units in visibility, so that it does not become widely used.

For example, JP-A No. 2000-47603 discloses a display unit capable of displaying more of information and being manufactured at lower cost. The display unit described in JP-A No. 2000-47603 comprises plural segment electrodes corresponding to plural display segments, and a common electrode disposed oppositely to the segment electrodes with a TN type liquid crystal interposed therebetween. One display digit for presenting an alphanumeric character and the others is constituted of the segment electrodes and the common electrode arranged oppositely to the segment electrodes.

In this display unit, the segment electrodes are divided into 4 groups and 4 common electrodes are assigned to the respective 4 groups. According to this construction, the amount of common driving signals and segment driving signals and the number of wiring patterns are greatly reduced, so that manufacture of the display unit is achieved at low cost with increase in the amount of information that can be displayed on the display unit.

The display unit described in JP-A No. 2000-47603 basically corresponds to an improvement on the conventional 7 segment display unit. In this display unit, two 7 display segment digits (display digits) are arranged in two lines in a lateral direction, one oblique display segment is provided between the digits or in a portion surrounded with the 7 display segments, or alternatively, four small display segments are arranged in the shape of an alphabetic character "x" to increase an amount of information that can be displayed. According to this basic configuration, a katakana character of voiceless sound and a special symbol can be displayed together with an alphanumeric character, and furthermore, a katakana letter of voiced sound or a p-sound can also be displayed by providing more of display digits additionally.

According to the display unit described in JP-A No. 2000-47603, however, even though it is provided with the basic construction for displaying an alphanumeric character (including a katakana character of voiceless sound and a special symbol), not only are 29 display segments required, but at least five kinds of display segments of different shape and size are also required. Hence, a manufacturing cost of a display segment itself increases and besides, the display segments have to be arranged in a specific complex pattern, which makes lighting-on and -off control of wiring and display segments complicated. In a case where the display segments are formed with light emitting diodes, brightness of the light emitting diode elements are fluctuated when the display segments are of different shape and size.

DISCLOSURE OF THE INVENTION

Problems to be Solved by the Invention

It is accordingly an object of the invention to provide a display unit suited for displaying an alphanumeric character, and provided with display surfaces composed of: the smallest possible number of display segments, and effecting sharpness of display and good visibility without fluctuation of brightness.

Means of Solving the Problems

In order to solve the problem, according to the invention, there is provided a display unit comprising a display region constituted of twenty-four display segments each of which has a triangular display surface, the display region consisting of a quadrangular central region and a quadrangular and annular peripheral region surrounding the central region, the central region having two quadrangular portions longitudinally arranged side-by-side, each of the two quadrangular portions consisting of four display segments, the peripheral region consisting of sixteen display segments.

According to the display unit of the invention, the twenty-four display segments each having a triangular display surface are arranged in a specific pattern as described above, so that not only an alphanumeric character can be sharply displayed, but also good visibility of the alphanumeric character in display is realized. Since the twenty-four display segments are enough to display all of the desired alphanumeric characters, the cost required for manufacturing the display unit can be reduced, and no fluctuation of brightness occurs over the display segments.

According to a preferred embodiment of the invention, the display region has the shape of a parallelogram as a whole. Hence, alphanumeric characters can be more clearly displayed and visibility of the display can be improved.

According to another preferred embodiment of the invention, the peripheral region comprises: first and third regions which are arranged on the upper and lower sides of the central region, respectively, and each of which consists of three display segments linearly arranged; and second and fourth regions which are arranged on the left and right sides of the central region, respectively, and each of which consists of five display segments linearly arranged. With this embodiment, twenty-four display segments can be effectively arranged for display of an alphanumeric character.

According to sill another embodiment of the invention, a display surface of each of the display segments has the same shape of a right-angled and isosceles triangle and the display region has the shape of a rectangle as a whole.

A display segment is preferably, for example, a light emitting diode element, but the display segment may be a liquid crystal display element. In a case liquid crystal elements are used, since each of the display element itself does not emit light, a light source for backlight is additionally used. According to the present invention, a display segment has only to have a triangular display surface and no specific limitation is imposed on a display mechanism of a display element itself.

EFFECTS OF THE INVENTION

According to the present invention, not only can an alphanumeric character be sharply displayed, but the display of the alphanumeric character is also good in visibility. In addition, twenty-four display segments are enough to display all of the desired alphanumeric characters, and, in addition, only two kinds of display segments having slightly different size are required, which reduces a manufacturing cost, and no fluctuation of brightness over display segments occurs.

DESCRIPTION OF REFERENCE NUMERALS

1: display unit
2: display region
10: central region
11, 12: quadrangular portions
13-16: peripheral region
a-x: display segments

BEST MODE FOR CARRYING OUT THE INVENTION

Figure 1:
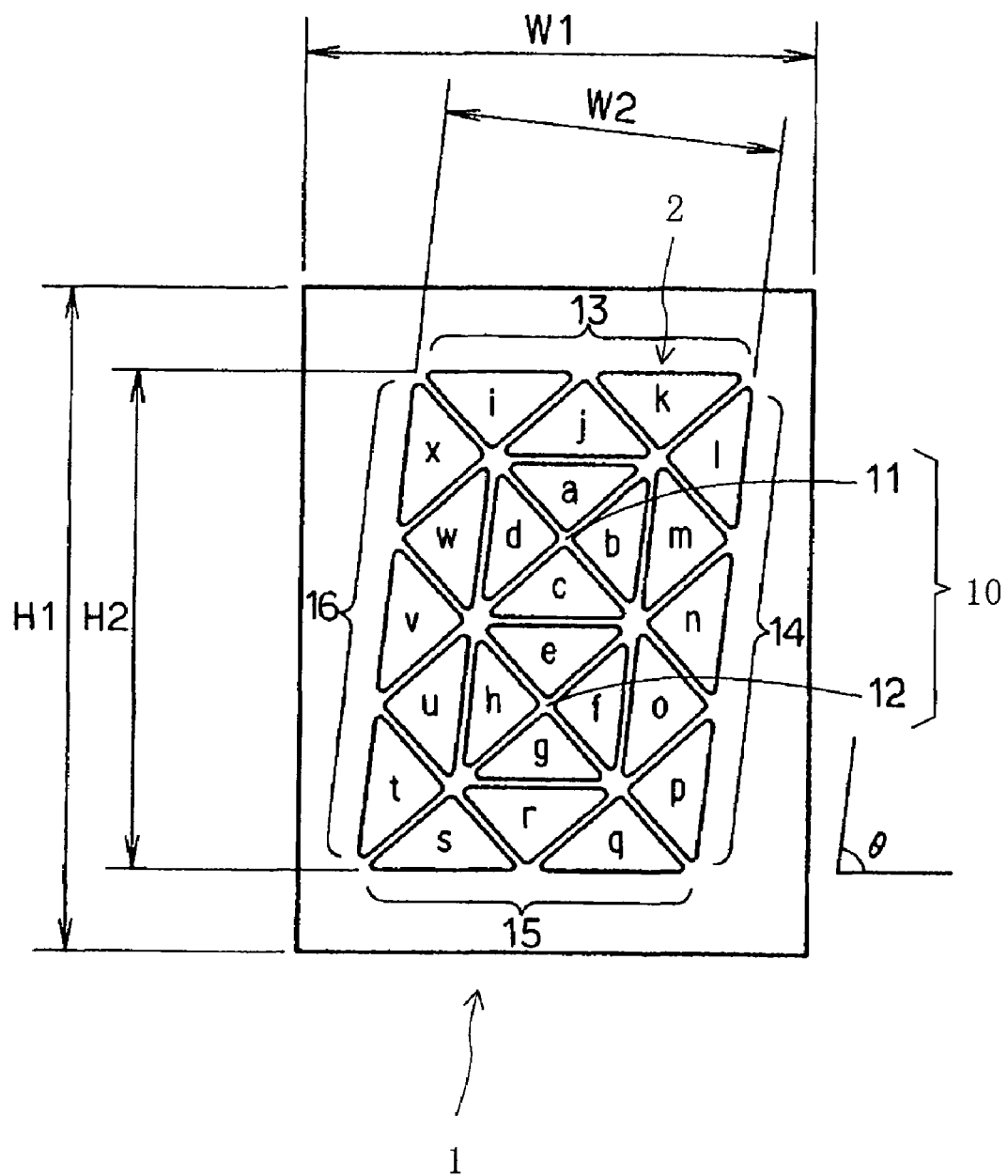
FIG. 1 is a plan view showing a pattern of arrangement of display segments of a display unit according to an embodiment of the invention.

A preferred embodiments of the present invention will be explained in detail with reference to the accompanying drawings. FIG. 1 is a plan view of a main part (a pattern of arrangement of display segments) of a display unit according to an embodiment of the present invention.

As shown in FIG. 1, a display unit 1 of the invention comprises a display region 2 having the shape of a parallelogram. The display region 2 is constituted of twenty-four display segments a to x each of which is provided with a triangular display surface. As is clear from FIG. 1, the display region 2 consists of a parallelogrammatic central region 10 and a parallelogrammatic and annular peripheral region 13 to 16 surrounding the central region 10. The central region 10 has two parallelogrammatic portions 11 and 12 longitudinally arranged side-by-side. Each of the two parallelogrammatic portions 11 and 12 consists of four display segments a to d, e to h.

The remaining sixteen display segments i to x are arranged in such a manner that they surround the whole of the two parallelogrammatic portions 11 and 12 (the central region 10) so as to form the parallelogrammatic and annular peripheral region 13 to 16. A first portion 13 of the peripheral region 13 to 16 is arranged on the upper side of the central region 10 and consists of three display segments i to k linearly arranged. A second portion 14 is arranged on the right side of the central region 10 and consists of five display segments l to p linearly arranged. A third portion 15 is arranged on the lower side of the central region 10 and consists of three display segments q to s linearly arranged. A fourth portion 16 is arranged on the left side of the central region 10 and consists of five display segments t to x linearly arranged.

The whole of the display region 2 consists of the central region 10 constituted of the two parallelogrammatic portions 11 and 12, and the parallelogrammatic and annular peripheral region 13 to 16 so as to form a rectangle.

As shown in FIG. 1, in each of the parallelogrammatic portions 11 and 12 of the central region 10, the four display segments a to d, e to h are arranged in such a manner that they direct an apex thereof inward in the same way. In each of the first and third portions 13 and 15 of the peripheral region 13 to 16, the three display segments i to k and q to s are arranged in such a manner that they direct an apex thereof upward and downward alternately, while in each of the second and fourth portions 14 and 16, the five display segments l to p and t to x are arranged in such a manner that they direct an apex thereof rightward and leftward alternately. In this case, it is assumed that the display segments a to x are light emitting diode elements, but the display segments are not specifically limited to the light emitting diode elements.

In the embodiment, in order to make character style to be displayed look as beautiful, an oblique side of the display region 2 in a parallelogrammatic shape is inclined relative to the bottom side by an angle θ (for example about 6 degrees). A size of the whole of the display unit 1 is, for example, such that a width W1 is 30 mm and the length H1 is 40 mm and a size of the whole of the display region 2 in a rectangular shape is, for example, such that a width W2 is 19.9 mm and the length H2 is 30 mm.

Note that the twenty-four display segments a to x are, though not shown, connected so as to be controlled in lighting-on or -off according to a display pattern of each alphanumeric character by wiring patterns.

Figure 2:
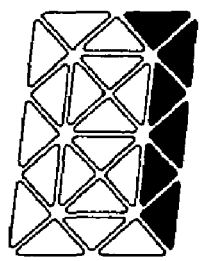
FIG. 2 is a diagram illustrating display patterns of numeric characters displayed by the display unit shown in FIG. 1.
Figure 2:
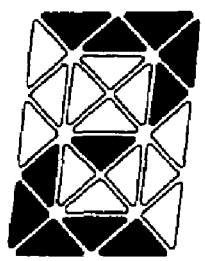
Figure 2:
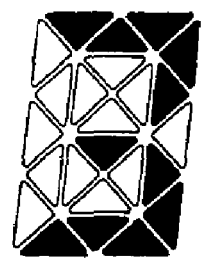
Figure 2:
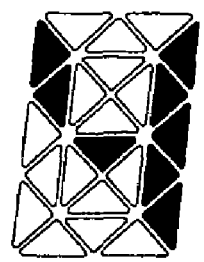
Figure 2:
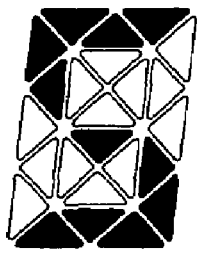
Figure 2:
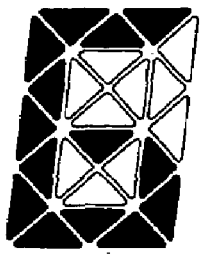
Figure 2:
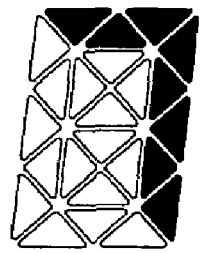
Figure 2:
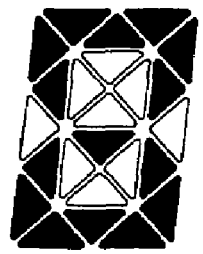
Figure 2:
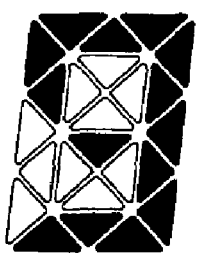
Figure 2:
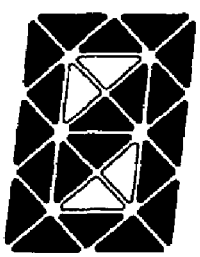

FIGS. 2 to 5 are diagrams illustrating examples of display (display patterns) of alphanumeric characters (in capital letters) displayed by the display unit 1 of the invention. In FIGS. 2 to 5, black solid portions exhibits lit-on display segments. FIG. 2 exhibits display patterns of numeric characters. For example, [1] is displayed by lighting on the display segments k to p and [2] is displayed by lighting on the display segments e, i to m and q to u. [3] to [9] and [0] are displayed by lighting on necessary display segments.

Figure 3:
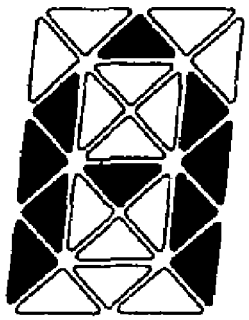
FIG. 3 is a diagram illustrating display patterns of alphabetic characters (in capital letters) displayed by the display unit shown in FIG. 1.
Figure 3:
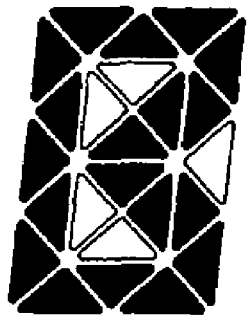
Figure 3:
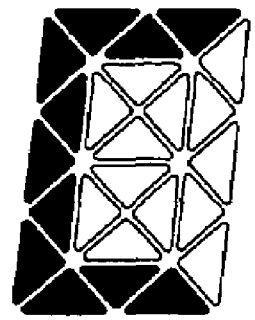
Figure 3:
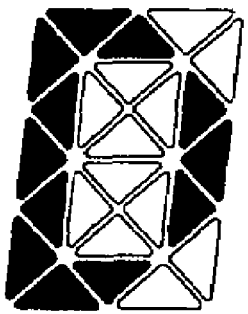
Figure 3:
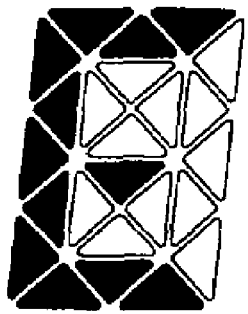
Figure 3:
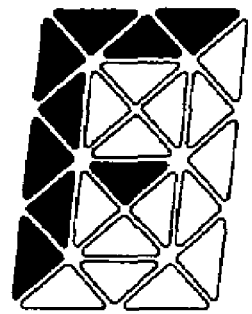
Figure 3:
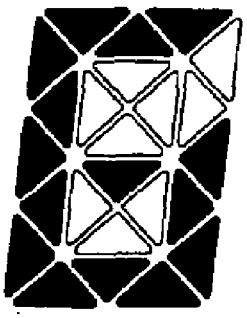
Figure 3:
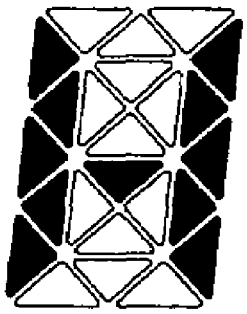
Figure 3:
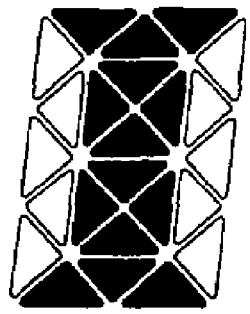
Figure 4:
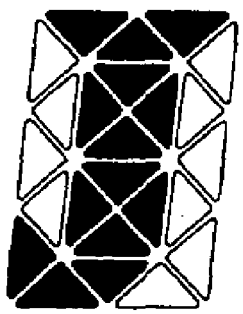
FIG. 4 is a diagram illustrating display patterns of alphabetic characters (in capital letters) displayed by the display unit shown in FIG. 1.
Figure 4:
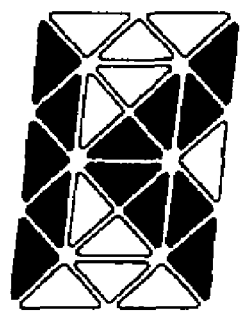
Figure 4:
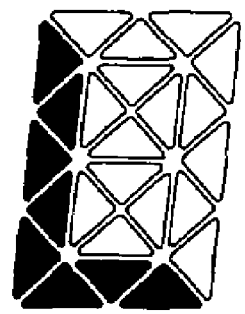
Figure 4:
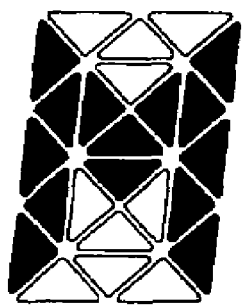
Figure 4:
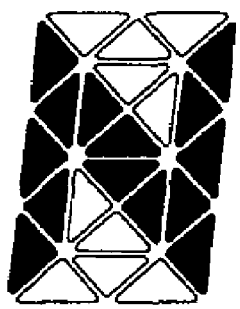
Figure 4:
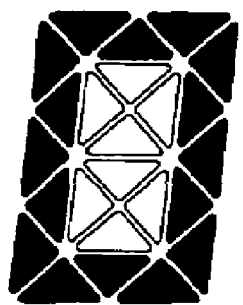
Figure 4:
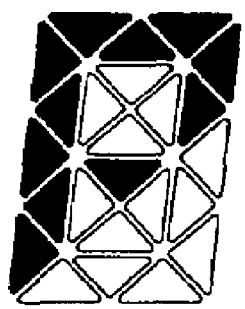
Figure 4:
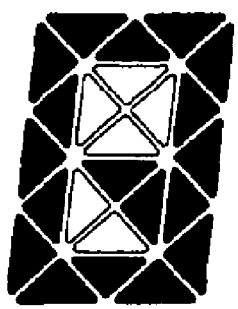
Figure 4:
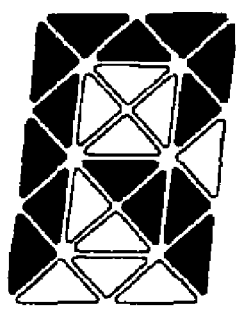
Figure 5:
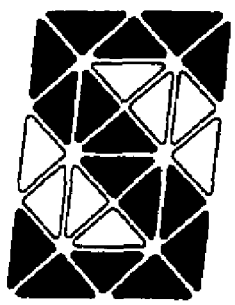
FIG. 5 is a diagram illustrating display patterns of alphabetic characters (in capital letters) displayed by the display unit shown in FIG. 1.
Figure 5:
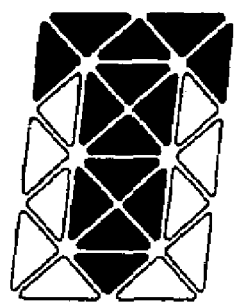
Figure 5:
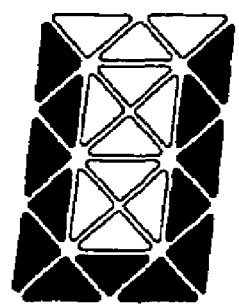
Figure 5:
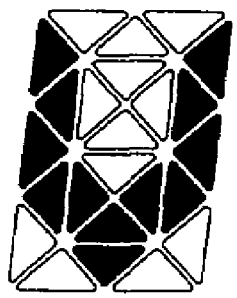
Figure 5:
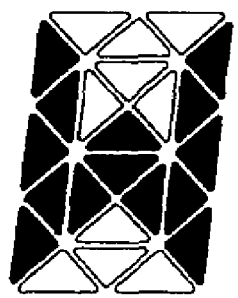
Figure 5:
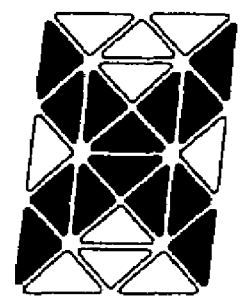
Figure 5:
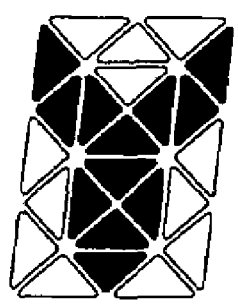
Figure 5:
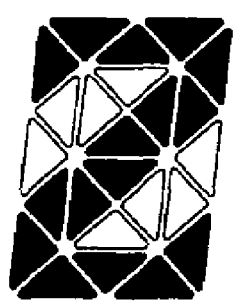

FIGS. 3 to 5 show display patterns of alphabetic characters (in capital letters) displayed by the display unit 1 of the invention. For example, [A] is displayed by lighting on the display segments e, j, m to p and t to w and [B] is displayed by lighting on the display segments b, c, e, f, i to m and o to x. [C], [D], [E], [F], [G], [H], [I], [J], [K], [L], [M], [N], [O], [P], [Q], [R], [S], [T], [U], [V], [W], [X], [Y] and [Z] are displayed by lighting on necessary display segments.

According to the display unit 1 of the invention, not only can alphanumeric characters be sharply displayed, but the display of the alphanumeric characters is also good in visibility. In addition, only twenty-four display segments a to x are required for displaying all of the alphanumeric characters, so that a manufacturing cost can be reduced and fluctuation of brightness over the display segments a to x does not occur.

Note that according to the display unit of the invention, though not shown, some special symbols can be displayed in addition to alphanumeric characters (in capital letters).

Figure 6:
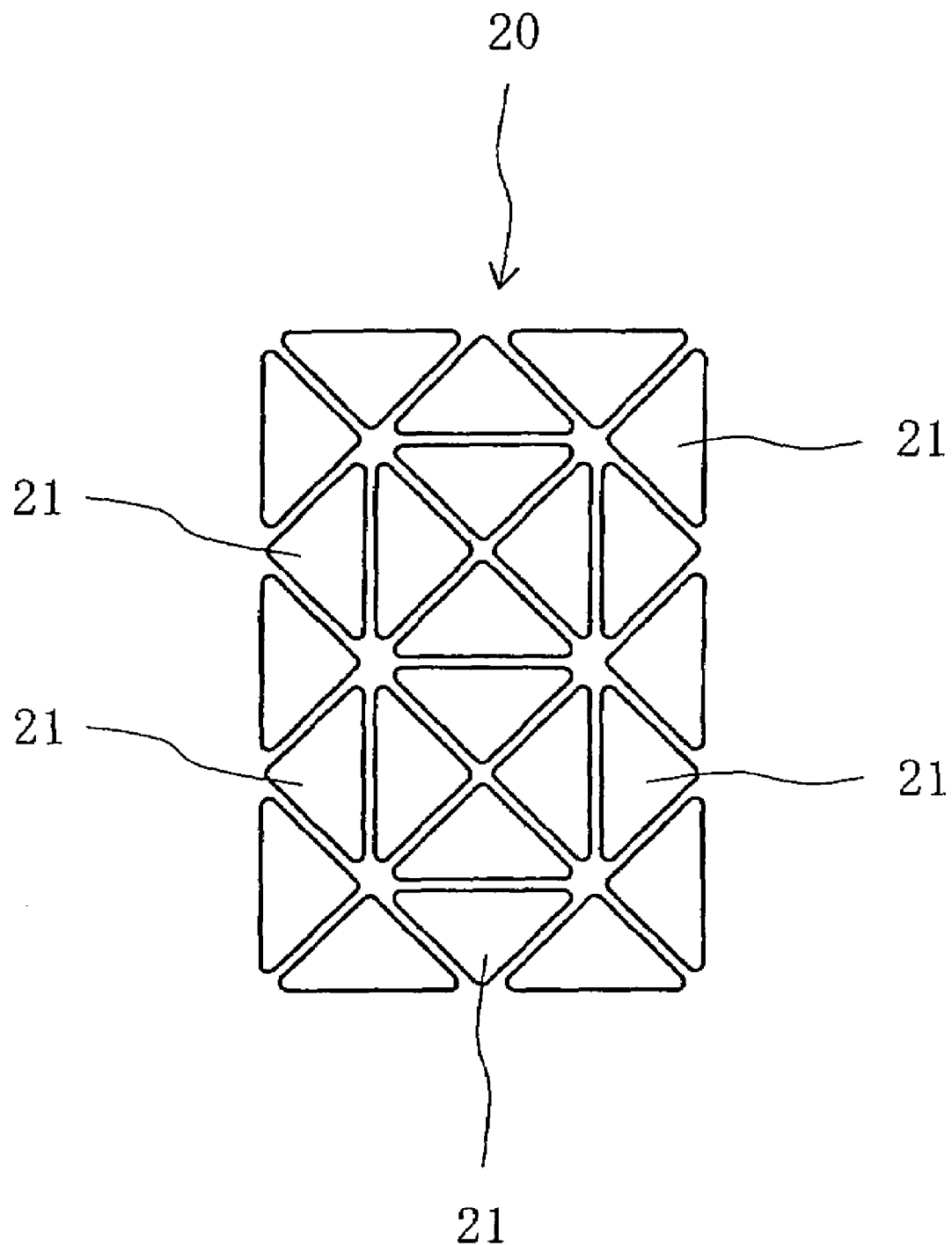
FIG. 6 is a plan view showing a pattern of arrangement of display segments of a display unit according to another embodiment of the invention.

FIG. 6 is a plan view showing a pattern of arrangement of display segments of a display unit according to another embodiment of the invention. In this embodiment, a display surface of each of the display segments 21 has the same shape of a right-angled and isosceles triangle and the display region 20 has the shape of a rectangle as a whole.

In this embodiment as well, as in the case of the embodiment described above, an alphanumeric character can be displayed and a similar effect can be obtained.

The invention claimed is:

1. A display unit, comprising: a display region constituted of twenty-four illuminating display segments each of which has a triangular display surface, said display region consisting of a quadrangular central region and a quadrangular, annular peripheral region surrounding said central region, said central region having two quadrangular portions longitudinally arranged side-by-side, each of said two quadrangular portions consisting of four of said display segments, said peripheral region consisting of sixteen of said display segments.

2. The display unit according to claim 1, wherein said display region is shaped as a parallelogram as a whole.

3. The display unit according to claim 2, wherein said peripheral region comprises: first and third regions which are arranged on upper and lower sides of said central region, respectively, and each of which consists of three of said display segments linearly arranged; and second and fourth regions which are arranged on left and right sides of said central region, respectively, and each of which consists of five of said display segments linearly arranged.

4. The display unit according to claim 1, wherein said display surface of each of said display segments is shaped as a right-angled, isosceles triangle, and wherein the display region is shaped as a rectangle as a whole.

5. The display unit according to claim 1, wherein each of said display segments is a light emitting diode element.

* * * * *